United States Patent
Garcia Duran et al.

(10) Patent No.: US 10,715,638 B2
(45) Date of Patent: Jul. 14, 2020

(54) METHOD AND SYSTEM FOR SERVER ASSIGNMENT USING PREDICTED NETWORK METRICS

(71) Applicant: NEC Europe Ltd., Heidelberg (DE)

(72) Inventors: Alberto Garcia Duran, Heidelberg (DE); Roberto Gonzalez Sanchez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 138 days.

(21) Appl. No.: 15/796,894

(22) Filed: Oct. 30, 2017

(65) Prior Publication Data
US 2019/0132422 A1 May 2, 2019

(51) Int. Cl.
| | |
|---|---|
| *H04L 29/08* | (2006.01) |
| *G06N 3/08* | (2006.01) |
| *H04L 29/06* | (2006.01) |
| *H04L 12/24* | (2006.01) |
| *H04L 12/26* | (2006.01) |
| *G06N 3/04* | (2006.01) |

(52) U.S. Cl.
CPC ............ *H04L 67/42* (2013.01); *G06N 3/04* (2013.01); *G06N 3/084* (2013.01); *H04L 41/147* (2013.01); *H04L 43/087* (2013.01); *H04L 67/10* (2013.01); *H04L 67/101* (2013.01)

(58) Field of Classification Search
CPC ..... H04L 67/42; H04L 41/147; H04L 43/087; G06N 3/04; G06N 3/084
See application file for complete search history.

(56) References Cited

U.S. PATENT DOCUMENTS

| | | | | |
|---|---|---|---|---|
| 2008/0310419 A1* | 12/2008 | Bansal | ................. | H04L 45/124 370/395.6 |
| 2011/0096675 A1* | 4/2011 | Li | ........................ | H04B 17/309 370/252 |
| 2014/0280803 A1* | 9/2014 | Kazerani | ............ | H04L 67/1036 709/221 |
| 2016/0323161 A1 | 11/2016 | Cuervo Laffaye et al. | | |
| 2018/0165579 A1* | 6/2018 | Friel | ..................... | G06F 9/5088 |
| 2018/0232508 A1* | 8/2018 | Kursun | ................ | G06N 3/0454 |
| 2019/0108445 A1* | 4/2019 | Huang | ................... | G06N 3/084 |

OTHER PUBLICATIONS

M. Wang, Y. Cui, X. Wang, S. Xiao, and J. Jiang. 2018. Machine learning for networking: Workflow, advances and opportunities. IEEE Network 32, Mar. 2, 2018, 92-99. DOI:https://doi.org/10.1109/MNET.2017.1700200.*

(Continued)

*Primary Examiner* — Natisha D Cox
(74) *Attorney, Agent, or Firm* — Leydig, Voit & Mayer, Ltd.

(57) ABSTRACT

A method for assigning a server to provide a resource to a client in a distributed network includes receiving a request for the resource from the client. A network metric is measured at different points in the network. The network metric measurements are input to a deep learning model. Using the model, the network metric is predicted between the client and each of a plurality candidate servers which have the resource and have not had a prior connection with the client. One of the candidate servers is assigned to provide the resource to the client based on the predictions of the network metric.

18 Claims, 5 Drawing Sheets

(56) References Cited

OTHER PUBLICATIONS

Tomas Mikolov, et al., "Efficient Estimation of Word Representations in Vector Space", Sep. 7, 2013, pp. 1-12.
Leon Bottou, "Large-Scale Machine Learning with Stochastic Gradient Descent", Proceedings of COMPSTAT'2010, Sep. 30, 2010, pp. 177-186.
Junchen Jiang, et al., "VIA: Improving Internet Telephony Call Quality Using Predictive Relay Selection", SIGCOMM'16, Aug. 22-26, 2013, pp. 1-14.
Sha Yuan, et al., "User.Oriented QoE-Driven Server Selection for Multimedia Service Provisioning in Content Distribution Networks", Research Gate, Aug. 2015, pp. 1-7.

* cited by examiner

METHOD AND SYSTEM FOR SERVER ASSIGNMENT USING PREDICTED NETWORK METRICS

FIELD

The present invention relates to a method and system for determining and assigning a server for providing a resource to a client requesting a service. The present invention is applicable to traditional client-server architectures, as well as non-client-server architectures in which one node is providing the resource to another node.

BACKGROUND

Internet applications utilize different distributed systems that aim to place the content and other resources close to the final user in order to minimize the delay and the bandwidth used. Such distributed systems include:

Content Delivery Networks (CDNs), employed to save traffic in the central server, and, at the same time, increase the performance observed by the users;

Cloud Computing services used to outsource the computation of expensive tasks to powerful machines in central datacenters. In the last years, the concept of Mobile Edge Computing (MEC) has been introduced. On it, low capacity devices are allowed to assign small tasks servers placed close to them;

Peer to Peer (P2P) systems where the final users connect directly to a set of peers in order to obtain different resources. These resources include the traditional distribution of content (e.g., Bittorrent), the online transmission of video streams (e.g., Acestream or Sopcast) or the distribution of software updates (e.g., the P2P distribution of Windows 10 updates).

All of these distributed systems address the problem unique to content distribution networks of assigning the correct resource to the correct user. In most cases, they use simple solutions, in particular, the selection of the resource that is geographically closer to the user (typically used by CDNs and other Anycast services) and the random peer selection usually performed in the P2P network. The metrics used are therefore simple and typically constant. While geographic proximity is related to Round Trip Time (RTT), other metrics are not considered.

SUMMARY

In an embodiment, the present invention provides a method for assigning a server to provide a resource to a client in a distributed network. A request for the resource is received from the client. A network metric is measured at different points in the network. The network metric measurements are input to a deep learning model. Using the model, the network metric is predicted between the client and each of a plurality candidate servers which have the resource and have not had a prior connection with the client. One of the candidate servers is assigned to provide the resource to the client based on the predictions of the network metric.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The inventors have recognized that the distribution of content for different types of services can be performed more efficiently by considering completely different metrics than the geographic proximity and random selection, as done in CDNs and P2P respectively. For example, for downloading a file the bandwidth is often the most important metric, but for an audio conference the most important metric can be the delay and for the reproduction of video using streaming a small jitter can be important to avoid excessive buffering.

Embodiments of the present invention provide for the selection of a best server based on predictions of different metrics. Previous works evidence that technical improvements and better service can result from intelligent selection of resources over what the traditional geographical or random selection can provide. Jiang, J., et al., "Via: Improving internet telephony call quality using predictive relay selection," In Proceedings of the 2016 conference on ACM SIGCOMM 2016 Conference, pp. 286-299 (August 2016) demonstrates that adding a server relay in Internet Telephony communications may improve the quality of the service for up to 53% of the calls. U.S. Patent Application Publication No. 2016/0323161 shows how machine learning techniques can be used to identify the expected performance of a job in a computing cluster.

Accordingly, selecting the best server in accordance with embodiments of the present invention results in better service for the clients and the resources can be provided with fewer problems because the selection is based on a specified metric for the service requested. Accordingly. Overall network efficiency is increased and servers and resources are allocated in a more efficient manner.

As used herein, a node initiating communication and requesting a resource will be referred to as the "client" and the nodes which have the resources available will be referred to as "servers". However, it is to be understood that the present invention also applies to non-client-server architectures, such as P2P systems.

According to embodiments, the present invention is able to predict the network metrics a client will observe before a connection is established to select a best server for the service that the client has requested. In particular, accurate network metrics predictions can be generated in accordance with embodiments of the present invention among points in the network that are not currently connected using deep learning to select the best server for the type of service. An embodiment of a method according to the present invention is divided into three different phases that are continuously executed in parallel: measuring the network metrics, modeling the network performance and assigning the resource based on metric predictions.

Measuring the network metrics can be performed using tools such as the Paris-traceroute to measure the network conditions between different nodes of the network. Additionally or alternatively, the metrics can also obtained during the provision of the resource itself. The specific tool/technology used for the measurement process depends on which metrics are to be measured. These metrics include, but are not limited to, Round Trip Time (RTT), jitter or network bandwidth.

Figure 1:
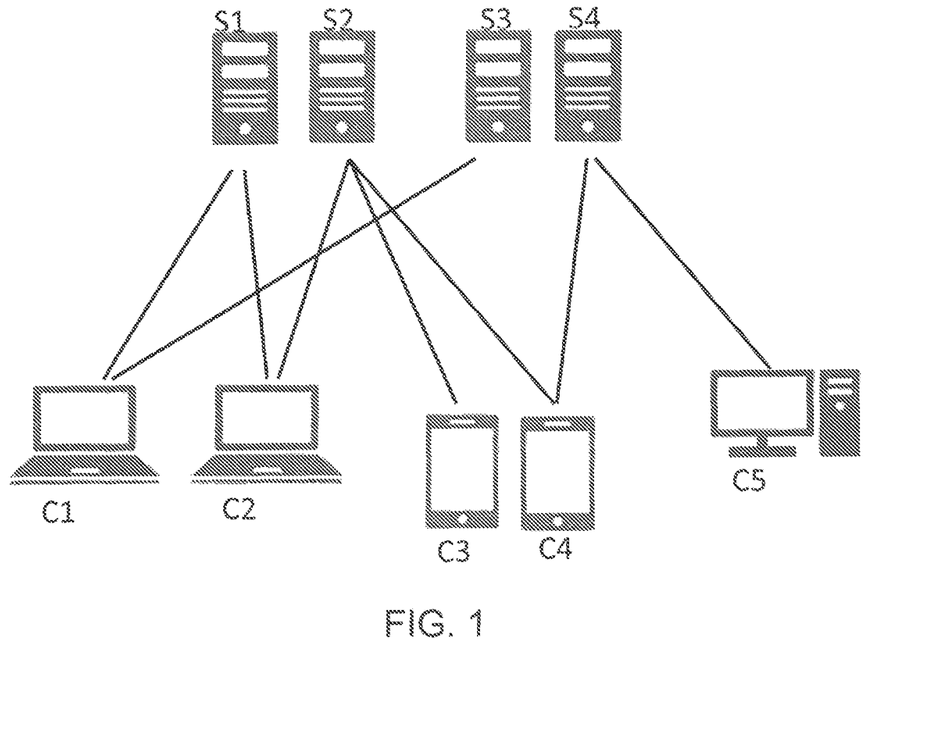
FIG. 1 is a schematic view of a content delivery network illustrating connections therein between nodes on which measurements can be taken and used for predicting metrics a connection between unconnected nodes.

The network metric measurement will calculate the metric between a subset of the servers and a subset of clients. In this case, the measurement can be done actively (among pairs that are not connected) or passively (measuring the quality of an existing connection). Advantageously, the metrics obtained are valid and useable in embodiments of the present invention even if they are taken among pairs that are not interested in the same resource. FIG. 1 illustrates one example with clients C1-C5 connected, as shown by the solid connecting lines, with different servers S1-S4, where servers S1 and S2 host resource A and servers S3 and S4 host resource B. In this example, the metrics obtained for the connection between S1 and C1 could be used in the process to infer what the connection quality between C5 and S3 would be, even though servers S1 and S3 are hosting different resources. Metrics are obtained for a set of connections, and then these measurements are used to train the model and predict the metric values for unseen connections. In this example, if C5 wants to access resource B, then it has two options: either server S3 or server S4. The metric for the connection S4-C5 has been measured. The model predicts the metric value for the connection S3-C5 and then consequently the system decides to which server (S3 or S4) C5 should connect to for accessing resource B.

For the case of client-server connections, a central node/server will recover the measurements from the rest of the servers in order to run the network performance modeling. In the case of a P2P system, the measurements could be limited to the connection among the peers, and the modeling can be done in a distributed way if the peers share their measurements making use of the P2P network, or in a centralized way, for example, in the Bittorrent tracker.

The second phase of modeling the network performance makes use of the data obtained through the network metrics measurement process to model the behavior of the complete network. The modeling is performed using novel deep learning algorithms to predict the considered network metric between a client and all servers that can provide a certain service (e.g., a video stream) that the user is interested in (also referred to herein as candidate servers). This network performance profiling is generic regardless of the network metric and thus it is possible to learn a machine learning model to independently characterize a set of metrics (e.g., delay, jitter, etc.). This allows, based on the requirements of the application, the system to choose which metric-specific model to use to assign a server to the client.

The proposed model generates one or more client and server representations based on a history of measurements of one or more network metrics between clients and servers. These latent representations aim to be meaningful with respect to the network metric under consideration. For example, the latent representations of two servers that have similar delay measurement values will be close in the Euclidean space, irrespective of any side information (e.g. geographical information, telecommunication provider, connection speed, etc.).

Figure 2:
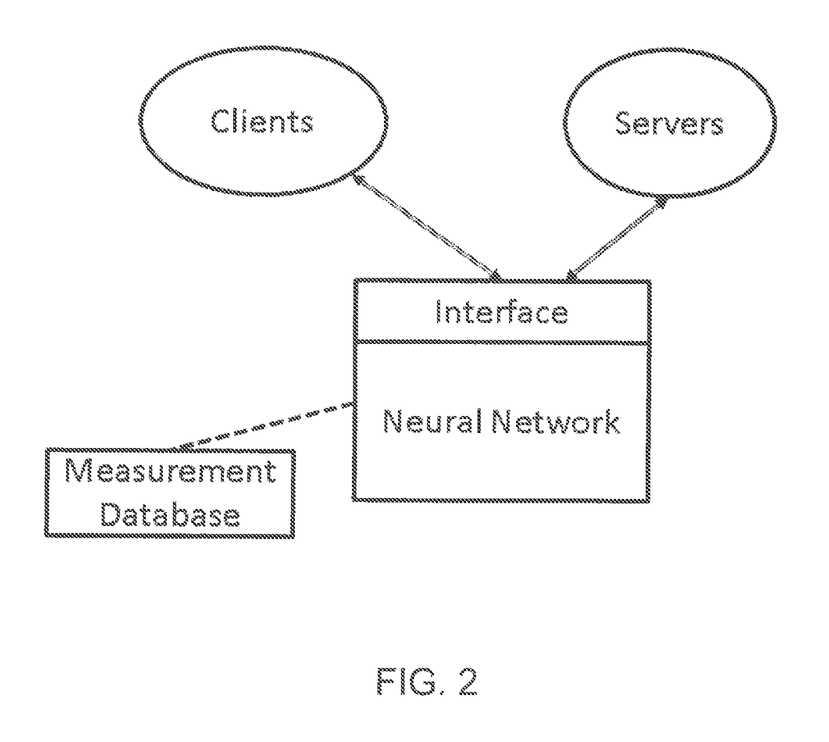
FIG. 2 is a schematic view of a system according to an embodiment of the invention.

As illustrated in FIG. 2, an embodiment of a system according to the present invention provides the network performance modeling architecture, which has three components: a Neural Network (NN) Component, a Measurement Database and a Client-NN Interface. The NN Component computes the predictions between the client and all candidate servers, leading eventually to the assignment of a specific server to the client. The Measurement Database contains sets of measurements, which are updated regularly so they can be used to re-adjust the weights of the NN Component accordingly as the conditions of the network evolve (e.g. congestion in some segments of the network; the availability and/or catalog of contents in the servers may change over time, etc.). The Client-NN Interface has to i) keep track of the network metric measurements of client-server pairs and update them in the Measurement Database accordingly, ii) regularly track the changes regarding the availability of contents across the servers, and iii) to trigger a metric-specific NN Component based on the requirements of the application.

Whenever a request to access a certain content from a client is received by the Client-NN Interface, the Client-NN Interface determines which servers provide such content (i.e., candidate servers). In the case of P2P networks, the tracker or a search in the P2P overlay could return the servers that contain such content. In a CDN, this information could be retrieved from a central server. The Client-NN Interface further determines the requirement (i.e. network metric) prioritized by the type of request to be deemed of quality. This is determined based on the nature of the connection. There can be a default network metric to prioritize for each type of request, which can be personalized by the user. Then, the Client-NN Interface triggers the NN Component corresponding to selected network metric, which computes the predictions of the selected network metric for all candidate servers and communicates a predicted best server to the client.

Figure 3:
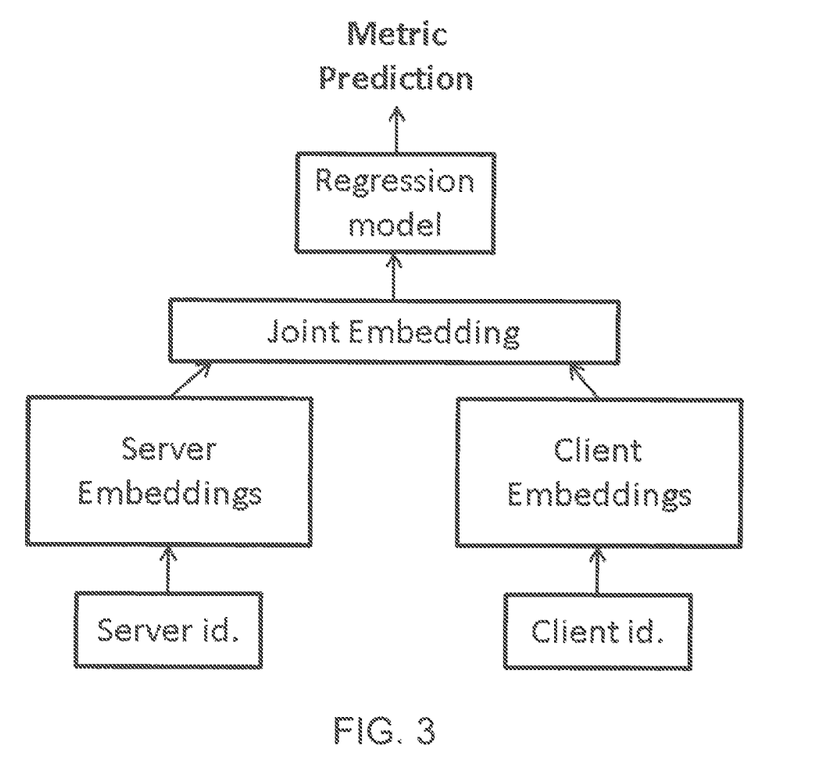
FIG. 3 is a schematic view of the Neural Network component of the system of FIG. 2.

For the sake of simplicity, the NN Component is described in the following with reference to a single network metric. FIG. 3 shows the structure of the NN Component according to an embodiment. The input to the model is a set of triples (client, server, measurement) expressing the measurement value of the network metric under consideration between a specific client and server. The model jointly learns the parameters of a regression model along with the representations of the clients and servers to make a prediction of the network metric. The model transforms the (sparse) one-hot-encoding (unique indexing) of the client and server into a lower dimensional dense vector representation, which are concatenated and fed into a regression model that predicts the metric under consideration. This can be formulated as follows:

$$\text{metric} = f_w(e_s, e_c) \qquad (1)$$

where $e_s$ and $e_c$ are the latent representations of the server and client, respectively, and $f_w$ is any differentiable operation applied to the representations of the server and client.

Collaborative filtering methods is a class of algorithms used for recommender systems which can be translated for use in embodiments of the present invention. There, a typical approach is as follows: the rating given on an item by a user is approximated by the dot product of the latent representation of the item and the user. This type of solution is also included in the definition of the NN Component given by Equation (1) above.

The NN Component is trained using the set of measurements stored in the Measurement Database component, which are regularly updated by the C-NN interface, allowing the NN Component to adjust their weights (i.e., latent representations and regression model parameters) as the conditions in the network change. Embeddings and weights of the regression model can be randomly initialized and trained using stochastic gradient descent (SGD), as discussed in Bottou, L., "Large-scale machine learning with stochastic gradient descent," In Proceedings of COMPSTAT' 2010, Physica-Verlag HD, pp. 177-186 (2010), and backpropagation. Embedding models have been applied to natural language processing (NLP) problems (where one-hot encodings correspond to words), as discussed in Mikolov, T., et al., "Efficient estimation of word representations in vector space," arXiv preprint arXiv:1301.3781 (2013), and to network request sequences, but not hitherto a network performance modeling setting.

Figure 4:
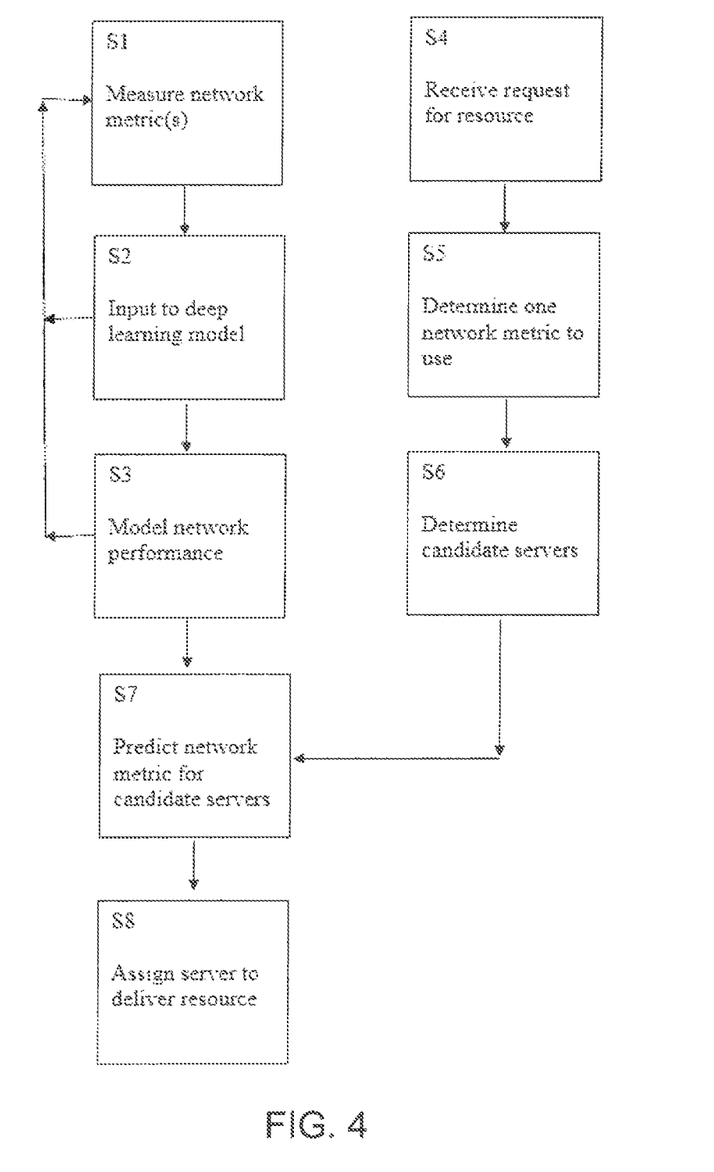
FIG. 4 is an overview of steps of a method implemented by the system of FIG. 2.

FIG. 4 illustrates a method according to an embodiment of the present invention. In a step S1, measurements of the different metrics are taken at different points in the network, preferably continuously, regularly, and/or as conditions in the network evolve. The measurements are stored in a database and updated with new measurements. Preferably each network metric of interest has a separate database associated thereto. In a step S2, the network metric measurements are fed into the deep learning model, with a separate model for each network metric of interest. The client-server pairs are represented by vectors and fed into a regression model, the parameters of which are learned by the deep learning model to predict the network metric under consideration for each of the pairs. Accordingly, in a step S3 the network performance is modeled, and can also be visualized. Steps S1-S3 can preferably run continuously, regularly, and/or as conditions in the network evolve. Accordingly, the models of the network performance for each of the network metrics will continue to learn and evolve.

At a step S4, which can occur anytime, a request is received from a client for a resource. Then, at a step S5, it is determined which network metric should be used for selecting a server to deliver the resource. For example, if the resource is streaming video playback, it can be determined to use jitter as the network metric. In a step S6, which can occur any time after receiving the request in step S4, the servers which have the requested resource available are determined as being the candidate servers. In a step S7, the network metric selected in step S5 is predicted for each of the candidate servers using the network performance model of the selected network metric from step S3. Then, in a step S8, the server having the best predicted performance for the selected metric is assigned to deliver the requested resource.

Figure 5:
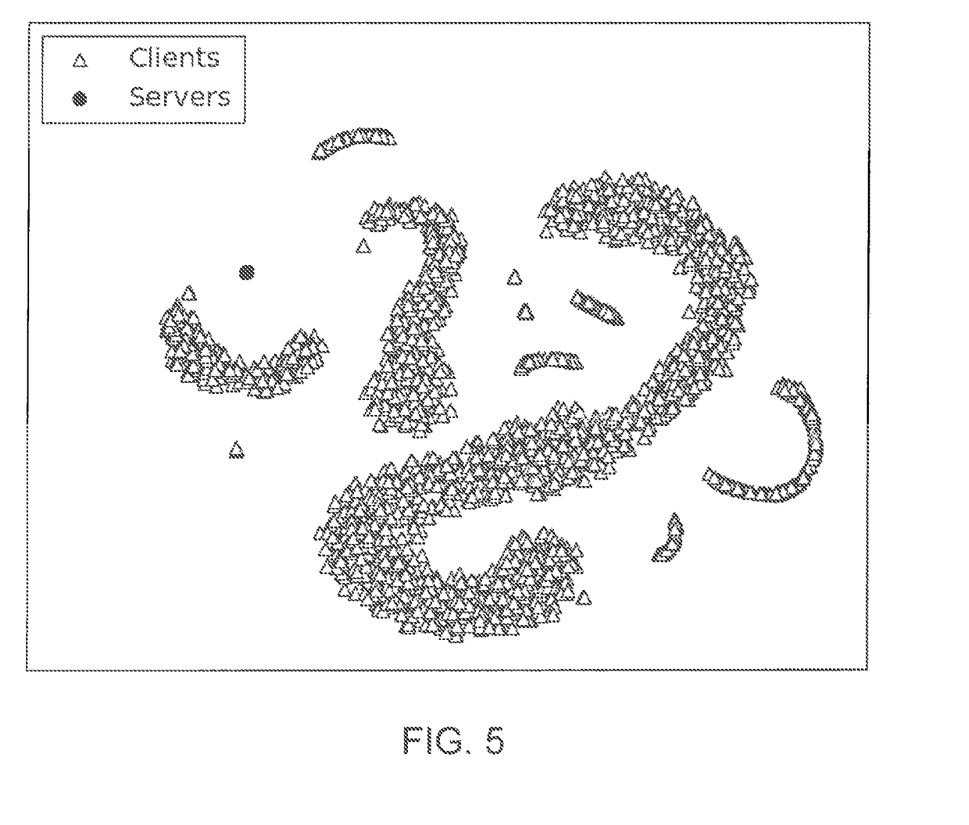
FIG. 5 is a 2D graphical view of client/server representations learned by a model according to an embodiment of the invention using a real-world dataset.

Other than for prediction purposes, these latent representations can also be used to visualize what the network looks like with respect to the network metric under consideration. Visualizations of network metrics experimented among the different nodes can be advantageously used, for example, to identify potential problems. FIG. 5 displays a set of 2D representations of clients and servers learned using the model described above from a real-word dataset of jitter measurements. The data set was provided by a telecommunication operator and contains jitter measurements between servers and clients. FIG. 5 shows the 2D representations learned according to an embodiment of the invention based on the jitter measurements. It reflects the layout of server and client representations learned based on this information. There is more than one server, but in a 2D representation space the servers can be practically overlapped in the same point.

For comparison, Table 1 below shows a jitter prediction. For the jitter prediction task, given a client and a server, an embodiment of the invention predicts the jitter, which is compared with the actual jitter value. The model is trained in the training split, and evaluated in the test split. Table 1 shows the mean absolute error (MAE) in the test set using the model as described above compared against two naive approaches that have access only to a set of measurements to make a prediction. These two approaches are 'Naive Mean' and 'Naive Median', which always predict the mean and median, respectively, of the set of measurements contained in the Measurement Database. Table 1 reports the MAE of these two approaches and the method according to an embodiment of the present invention for the jitter prediction task. The lower MAE, the better the prediction is.

TABLE 1

| Mean Absolute Error (MAE) | | |
| --- | --- | --- |
| Model according to an embodiment of the present invention | Naive Mean | Naive Median |
| 17.4 | 166 | 144 |

As can be seen in Table 1, according to the MAE, the model according to an embodiment of the present invention as discussed above is able to achieve significantly better predictions than the Naive Mean and the Naive Median. As yet a further advantage, the network performance modeling according to an embodiment of the present invention as discussed above does not assume any network condition. Thus, it can be used in the common case where the servers and clients do not have any prior knowledge of the underlying network structure.

Once the model of the network has been obtained, it can be used to predict the metrics expected among every pair of client and server in the network. The model can output the expected jitter for every potential connection between client and server. Customizable rules can be used to aid in the selection of the most appropriate server. Each time a client needs to start a connection, the system will calculate the expected metrics for the client, returning the best set of servers given the specific rules for the requested service (e.g., the servers with least jitter and bandwidth over a given threshold.). In the case of a client with no prior measurements done in the system, the legacy assignment system can be used (e.g., geographically close server or random).

The server so selected as the best server for the type of service, can then be assigned to deliver the resource to the client. This resource assignment can be done by the Anycast providers providing tailored Domain Name System (DNS) responses to the clients depending on user needs. In the case of P2P networks, similar to the measurement process, the resource assignment can be done in a distributed way by the peers, or directly by the tracker.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for assigning a server to provide a resource to a client in a distributed network, the method comprising:
   receiving a request for the resource from the client;
   measuring a network metric at different points in the network;
   inputting the network metric measurements to a deep learning model;
   predicting, using the model, the network metric between the client and each of a plurality candidate servers which have the resource and have not had a prior connection with the client; and
   assigning one of the candidate servers to provide the resource to the client based on the predictions of the network metric.

2. The method according to claim 1, further comprising storing the measurements of the network metric in a measurement database, updating the measurement database as conditions in the network evolve and using the updated measurement database to train the model.

3. The method according to claim 2, wherein the deep learning model includes latent representations of the client and the servers and a regression model having embeddings and weights which are trained using the updated measurement database according to stochastic gradient descent and backpropagation methods.

4. The method according to claim 3, further comprising using the latent representations to produce a visualization of the network with respect to the network metric.

5. The method according to claim 1, wherein the resource is video and the network metric is jitter.

6. The method according to claim 1, wherein the resource is an audio conference and the network metric is delay.

7. The method according to claim 1, further comprising providing the resource to the client from the assigned server.

8. The method according to claim 1, wherein a type of the network metric which is measured and used for the prediction is based on a type of the resource which is requested.

9. A system for assigning a server to provide a resource to a client in a distributed network, the system comprising:
   a client-neural network interface connected to the client and operable to receive a request for the resource from the client;
   a measurement database containing measurements of a network metric; and
   a neural network component operable to predict, using a deep learning model in which the measurements of the network metric are input, the network metric between the client and each of a plurality of candidate servers which have the resource and have not had a prior connection with the client,
   wherein the client-neural network interface is operable to assign one of the candidate servers to provide the resource to the client based on the predictions of the network metric.

10. The system according to claim 9, wherein the client-neural network interface is operable to update the measurement database as conditions in the network evolve.

11. The system according to claim 10, wherein the deep learning model includes latent representations of the client and the servers and a regression model having embeddings and weights, the neural network component being operable to train the embeddings and weights using the updated measurement database according to stochastic gradient descent and backpropagation methods.

12. The system according to claim 9, wherein the client-neural network interface is operable to determine different types of the network metric to be used based on a type of the resource requested by the client.

13. The system according to claim 12, wherein the client-neural network interface is operable to determine that the network metric is jitter based on the resource being video.

14. The system according to claim 12, wherein the client-neural network interface is operable to determine that the network metric is delay based on the resource being an audio conference.

15. The system according to claim 9, wherein the measurement database includes measurements for a plurality of network metrics including jitter and delay, and wherein the client-neural network interface is operable to select one of the network metrics to be used by the neural network component for the predictions.

16. The method according to claim 1, wherein the distributed network is a content delivery network (CDN), cloud computing network, or a peer to peer (P2P) network in which the candidate servers which host the resource are only a part of a total number of servers in the distributed network.

17. The method according to claim 1, wherein the measurements of the network metric at the different points of the network which are used as the input to the deep learning model are taken continuously or regularly.

18. The method according to claim 1, wherein client-server pairs in the distributed network are represented by vectors and fed into a regression model whose parameters are learned by the deep learning model to predict the network metric for each of the client-server pairs.

* * * * *